United States Patent [19]

Feuerbacher et al.

[11] 3,792,731

[45] Feb. 19, 1974

[54] SECONDARY RECOVERY PROCESS USING SURFACTANT MIXTURES

[75] Inventors: David G. Feuerbacher; George A. J. Homolka, both of Bellaire; Gerald W. Alves, Houston, all of Tex.

[73] Assignee: Texaco Inc., New York, N.Y.

[22] Filed: May 8, 1972

[21] Appl. No.: 251,729

[52] U.S. Cl. ............................................... 166/274
[51] Int. Cl. ............................................ E21b 43/22
[58] Field of Search ............... 166/273–275, 305; 252/8.55 D

[56] References Cited
UNITED STATES PATENTS

| | | | |
|---|---|---|---|
| 3,096,820 | 7/1963 | Bernard | 166/274 |
| 3,348,611 | 10/1967 | Reisberg | 166/275 |
| 3,446,282 | 5/1969 | Cooke, Jr. | 166/274 |
| 3,468,377 | 9/1969 | Dunlap et al. | 166/274 |
| 3,467,190 | 9/1969 | Dunlap et al. | 166/274 X |
| 3,498,379 | 3/1970 | Murphy | 166/274 X |
| 3,369,602 | 2/1968 | Fallgatter et al. | 166/273 |

*Primary Examiner*—Stephen J. Novosad
*Attorney, Agent, or Firm*—Thomas H. Whaley; Carl G. Ries

[57] ABSTRACT

Improved recovery in a waterflood process is effected by the use of a saline, aqueous slug containing a mixture of a nonionic and an anionic surfactant, followed by a drive agent such as water, brine or thickened water or brine.

14 Claims, No Drawings

SECONDARY RECOVERY PROCESS USING SURFACTANT MIXTURES

FIELD OF THE INVENTION

This invention relates to a secondary or tertiary recovery process for the recovery of oil from a subterranean oil-bearing reservoir. More particularly, it pertains to an improved process for waterflooding by use of a slug of a saline, aqueous solution containing a nonionic surfactant and an anionic surfactant, which is first injected into the reservoir and is thereafter driven through the reservoir by a driving agent such as water, brine or thickened water or brine.

PRIOR ART

Primary production of oil from subterranean oil-bearing reservoirs is normally obtained by exploiting the natural energy of the reservoir in the form of water drive, gas-cap drive, solution gas drive and combinations thereof. Oil remaining in the reservoir after primary energy sources have been depleted may be partially recovered by secondary recovery methods. One of the most common secondary methods is waterflooding. In this method, flooding water is injected into the reservoir through one or more injection wells traversing the oil-bearing reservoir. The water displaces the oil in the reservoir and moves it through the reservoir toward one or more production wells from which the oil is produced.

However, this secondary method may only recover up to 30-50 percent of the remaining oil in place, thus leaving considerable quantities of oil behind.

It is well known that the efficiency of waterflooding may be improved by the use of surfactants in the flood water. It is believed that surfactants effect improved recovery by increasing the wettability of the reservoir matrix by water and by decreasing the interfacial tension betwen the oil and the water phases. Generally, the lower the interfacial tension the greater the oil recovery.

It is also well known that the efficiency of waterflooding may be improved by the use of water-soluble polymers in the flood water, whereby the viscosity of the flood water is increased. This thickened water results in a more favorable mobility ratio and leads to improved oil recovery. One such water-soluble polymer includes hydrolyzed acrylamide polymers, such as Dow Pusher 700, manufactured by the Dow Chemical Co.

In addition, it is known that the interfacial tension can be lowered by the use of a monovalent salt in the displacing fluid. By monovalent salt is meant a water-soluble salt containing monovalent cations, thus excluding salts having multivalent cations such a calcium and magnesium, with which surfactants are ordinarily not compatible. The largest group of monovalent salts are the alkali metal halides including the salts of sodium and potassium. Thus sodium chloride is the practical salt that is used.

Minimum interfacial tension between an aqueous phase and an oil phase can be determined as has been described in the prior art by delineating the salinity concentration, surfactant composition and surfactant concentration for a particular reservoir.

In the process of using surfactants, generally the method involves injecting a slug of solution of the surfactant which may contain a known quantity of monovalent salt and thereafter injecting a displacing agent which may contain a thickener to displace the surfactant slug through the reservoir.

SUMMARY OF THE INVENTION

This invention relates to the secondary or tertiary recovery of oil whereby a saline, aqueous slug containing a nonionic surfactant and an anionic surfactant is injected into the formation and thereafter a displacing fluid such as water or brine or thickened water or brine is injected to displace the slug and the reservoir oil through the formation to a production well from which the oil is produced.

DESCRIPTION OF THE PREFERRED EMBODIMENT

This invention is based upon the fact that the use in combination of a nonionic surfactant and an anionic surfactant will significantly increase the recovery of oil from a reservoir.

In the method of the invention, an aqueous slug having a predetermined concentration of a monovalent salt such as sodium chloride and containing a nonionic and an anionic surfactant is injected into the reservoir followed by an aqueous displacing agent.

One of the surfactants must be nonionic and the other anionic. It is preferable that one of the surfactants have a slightly greater affinity for water than for oil and the other surfactant have a slightly greater affinity for oil than for water.

A nonionic surfactant is one that does not ionize in water but owes its surface active properties to a hydrophilic ether linkage.

A nonionic surfactant may be chosen from ethoxylated alkyl phenols, ethoxylated alcohols, polymers or co-polymers of ethylene oxide and/or propylene oxide, ethoxylated thioethers, ethoxylated amines or any other commerical available nonionic surfactants, including, for example, Tergitol NP-27 (ethoxylated nonly phenol) manufactured by Union Carbide Corp.

The anionic surfactants may be a petroleum sulfonate, other refined alkyl aryl sulfonates, alkyl sulfonates, alkyl sulfates, sulfosuccinates (or sodium salts of these), or any commercially available anionic surfactant as, for example, Pyronate 50 (a petroleum sulfonate-sodium salt) manufactured by Whitco Chemical Corp.

In practicing the invention the following procedure is recommended: after the proper aqueous solution is chosen from laboratory tests on the particular oil and reservoir of interest, a pre-flush solution is injected into the reservoir. The pre-flush may be water, brine, thickened water or brine or an aqueous solution of either inorganic salts or additives to minimize adsorption of the surfactants. Additives that are capable of inhibiting adsorption include sodium sulfate, sodium nitrate, sodium hydroxide, sodium silicate, sodium phosphate, sodium fluoride, hydrofluoric acid and quaternary amines such as tetramethyl ammonium chloride.

The proper aqueous solution is determined in the laboratory wherein suitable surfactants are first screened to limit surfactant compounds to those which in aqueous solution result in a surface tension with the crude oil under study to less than 1.0 dyne per centimeter. In this screening both the ratio of the two surfactants and the concentration of electrolyte may be varied to determine the optimum mixture, i.e., the mixture that gives a minimum surface tension. Values of less than 0.01 dyne per centimeter are preferred, since these values indicate that the surfactant solution is approaching miscibility or pseudomiscibility with the crude oil.

The surfactant solutions selected by the above criteria are then tested for adsorption on reservoir matrix. One method for determining adsorption is by use of a static adsorption technique wherein the solution of surfactant is permitted to remain in contact with a measured quantity of crushed reservoir matrix for a given period of time, e.g., several hours, and then measuring the reduction in surfactant concentration in the solution. Another procedure is to use a dynamic adsorption technique whereby a slug of the surfactant solution is passed through a column of crushed reservoir rock, and thereafter water or brine is passed through the column and an adsorption isotherm is calculated from the surfactant concentrations in the effluent fractions. The absorption tests eliminate from further test those surfactant mixtures that show high adsorption on the matrix.

The selected surfactant mixtures are then tested in an oil displacement test using the surfactant solution to displace the crude oil of interest in a pack of crushed reservoir matrix or a mounted reservoir core.

In the displacement core test, the core or matrix pack after being suitably mounted is saturated with the crude oil of interest to give an oil-wet system or it may first be saturated with a brine solution, which is subsequently displaced with crude oil giving a water-wet system. The core is then flooded with water to a high water/oil ratio (WOR) and is then flooded with the selected surfactant mixture solution, followed by the drive flood.

The invention resides in the fact that by using two different surfactants an unexpected synergistic effect occurs which, it is postulated, results in:

a. A lower interfacial tension than would be realized by the use of either surfactant alone, b. A lower adsorption on the reservoir matrix than that of either surfactant by itself in the saline solution, c. A synergistic combination of a good wetting agent which gives more complete displacement of the oil from the oil-wet portions of the reservoir and a good emulsifier which promotes the formation of a tight oil-in-water emulsion at the leading edge of the surfactant slug which is pseudomiscible with the oil in the reservoir.

d. A higher tolerance for electrolyte than either surfactant alone.

In one example of the invention the synergistic effect was demonstrated by the use of a surfactant mixture containing thickener and Tergitol NP-27 and Pyronate-50. The thickened surfactant mixture contained sodium chloride in a concentration of 5 percent by weight. Runs were made using slim tube tests of oil-wet 80/200 mesh crushed limestone core and oil from the Slaughter Field, Hockley County, Texas.

TABLE II

Effect of Sodium Chloride Concentration in Surfactant Slug on Oil Recovery

| Run No. | Composition of Surfactant in Slug | Concentration of NaCl in Slug | Oil Produced (P.V.) |
|---|---|---|---|
| 41 | 0.50% T-NP-27* 0.50% P-50 | 5.0 | 0.136 |
| 44 | 0.50% T-NP-27 0.50% P-50 | 9.1 | 0.089 |
| 47 | 0.50% T-NP-27 0.50% P-50 | 13.0 | 0.067 |
| 40 | 0.33% T-NP-27 0.67% P-50 | 5.0 | 0.122 |
| 43 | 0.33% T-NP-27 0.67% P-50 | 9.1 | 0.101 |
| 46 | 0.33% T-NP-27 0.67% P-50 | 13.0 | 0.064 |

* T-NP-27 is Tergitol NP-27, manufactured by Union Carbide Corp.

** P-50 is Pyronate 50, manufactured by Whitco Chemical Corp.

The results in Table I show that the recovery of oil was substantially higher from the runs in which a combination of surfactants was used as compared with the runs in which surfactants were used alone.

In Table II is shown the dependency on the oil recovery of the sodium chloride concentration. The results show that at a sodium chloride concentration of 5 percent by weight the greatest oil recovery was realized.

In practicing the invention, it is recommended that the slug containing the surfactant mixture and the sodium chloride be injected in amounts of from about 0.05 to about 0.5 of the reservoir pore volume. The synergistic surfactant mixture should contain from about 20 to about 50 percent by weight of the nonionic surfactant, with the balance, i.e., 80 to 50 percent by weight, being the anionic surfactant. This surfactant mixture is used in the aqueous saline slug in concentrations of from about 0.5 to 2.5 percent by weight of surfactant. The salt concentration in the slug should be in the range of from about 0.5 to about 15.0 percent by weight with the optimum concentration being determined by laboratory tests as described heretofore.

Preferably, the slug may also contain a thickening agent such as, for example, Dow Pusher 700, manufactured by the Dow Chemical Co. The thickener may be employed in the amount of from about 0.01 to about 0.5 percent by weight of the solution.

In the method of the invention the slug is injected into the reservoir followed by a driving medium such as water, brine or thickened water or brine, which displaces the slug and the reservoir oil through the reservoir to a producing well from which it is produced.

We claim:

1. A method of recovering oil from a subterranean oil-bearing reservoir traversed by at least one injection well and one production well, comprising the steps of:

a. injecting into said reservoir via said injection well an aqueous saline slug containing a mixture of a nonionic surfactant and an anionic surfactant, said surfactant mixture being present in said slug in a TABLE I. — Tertiary Oil Recovery With Aqueous Surfactant Solutions

| Run No. | Composition of slug (wt. %) | Oil saturation after waterflood (P.V.) | Volume of slug (P.V.) | Volume of drive agent (P.V.) | Oil saturation after surfactant flood (P.V.) | Oil produced (P.V.) |
|---|---|---|---|---|---|---|
| 1 | 5% brine, 1.0% T-NP-27* | 0.227 | 0.383 | 1.924 | 0.158 | 0.069 |
| 2 | 2% brine, 1.0% P-50** | 0.260 | 0.334 | 1.591 | 0.176 | 0.084 |
| 3 | 5% brine, 0.33% T-NP-27; 0.67% P-50... | 0.291 | 0.333 | 1.458 | 0.169 | 0.122 |
| 4 | 5% brine, 0.50% T-NP-27; 0.50% P-50... | 0.282 | 0.328 | 1.288 | 0.146 | 0.136 |

*T-NP-27 is Tergitol NP-27, manufactured by Union Carbide Corp.
**P-50 is Pyronate-50, manufactured by Whitco Chemical Corp.
Both the surfactant solution and the drive agent contain 0.107% Dow Pusher 700, manufactured by Dow Chemical Co.

concentration of from about 0.5 percent to about 2.5 percent by weight;

b. driving said slug through said reservoir by injecting into said reservoir via said injection well an aqueous driving medium;

c. recovering said oil displaced ahead of said slug from said production well.

2. The method of claim 1 wherein said slug is injected in amounts from about 0.05 to about 0.5 of the reservoir pore volume.

3. The method of claim 1 wherein said mixture contains from about 20 percent to about 50 percent by weight of said nonionic surfactant, and about 80 percent to about 50 percent by weight of said anionic surfactant.

4. The method of claim 1 wherein said saline slug contains about 0.5 percent to about 15.0 percent of an alkali metal halide.

5. The method of claim 4 wherein said alkali metal halide is sodium chloride.

6. The method of claim 1 wherein said slug contains a thickening agent in amounts from about 0.01 percent to about 0.5 percent by weight.

7. The method of claim 1 wherein said driving fluid is water, brine, thickened water, thickened brine and mixtures thereof.

8. In a waterflood process for recovering residual oil from a subterranean oil-bearing reservoir where-in an aqueous driving agent is injected into at least one injection well, and oil is thereby displaced through the reservoir and recovered at at least one production well, the improvement comprising injecting via said injection well and prior to the injection of said aqueous driving agent, an aqueous saline slug containing a mixture of a nonionic surfactant and an anionic surfactant, said surfactant mixture being present in said slug in a concentration of from about 0.5 percent to about 2.5 percent by weight.

9. The method of claim 8 wherein said slug is injected in amounts from about 0.05 to about 0.5 of the reservoir pore volume.

10. The method of claim 8 wherein said mixture contains from about 20 percent to about 50 percent by weight of said nonionic surfactant, and about 80 percent to about 50 percent by weight of said anionic surfactant.

11. The method of claim 8 wherein said saline slug contains about 0.5 percent to about 15.0 percent of an alkali metal halide.

12. The method of claim 11 wherein said alkali metal halide is sodium chloride.

13. The method of claim 8 wherein said slug contains a thickening agent in amounts from about 0.01 percent to about 0.5 percent by weight.

14. The method of claim 8 wherein said driving fluid is water, brine, thickened water, thickened brine and mixtures thereof.

* * * * *